N. & L. NILSON.
TRACTION PLOW.
APPLICATION FILED NOV. 2, 1914.
1,164,308.
Patented Dec. 14, 1915.
2 SHEETS—SHEET 1.
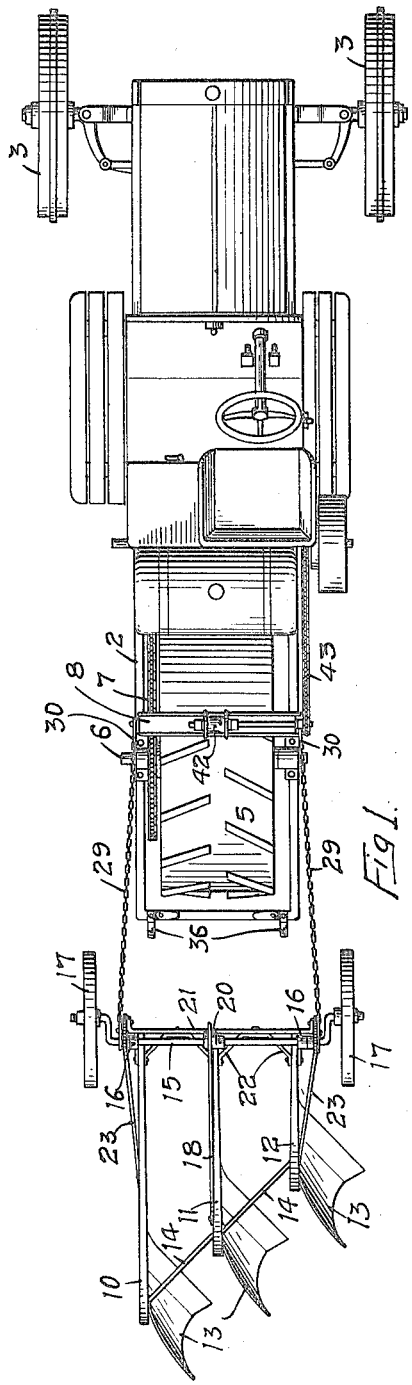
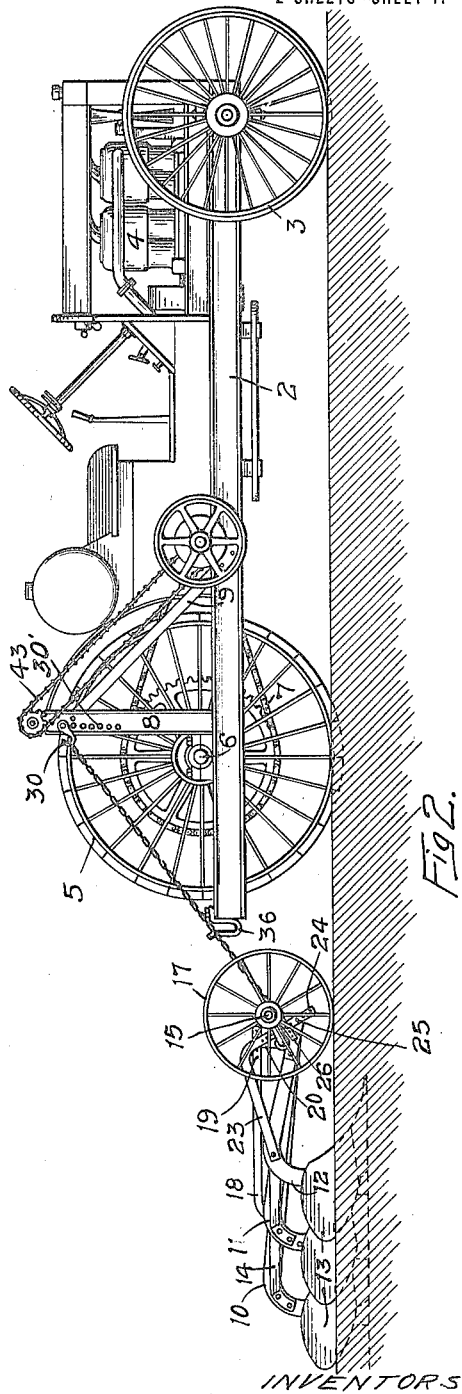
WITNESSES
INVENTORS
NILS NILSON
LEONARD NILSON
BY Paul & Paul
ATTORNEYS

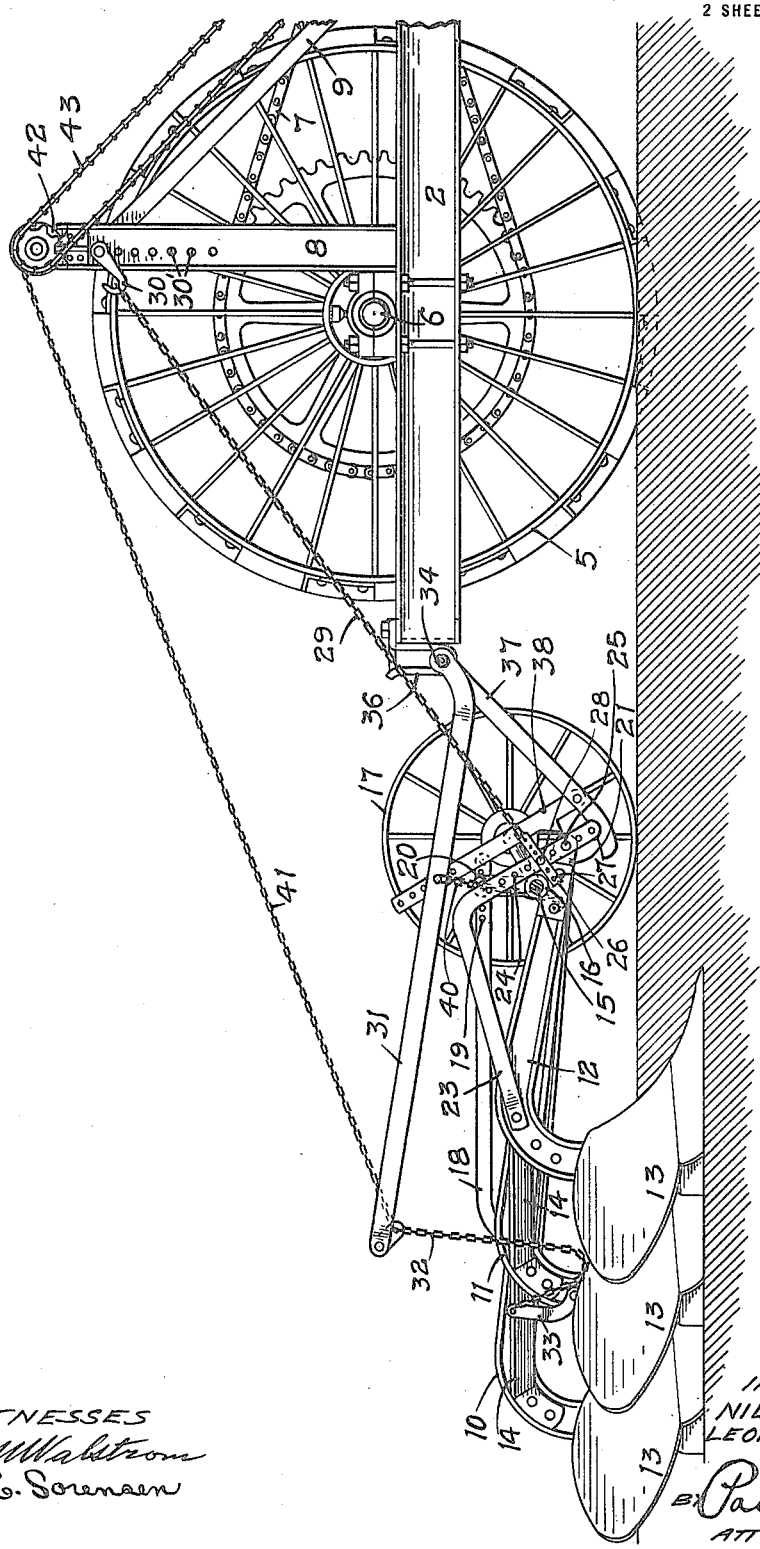

UNITED STATES PATENT OFFICE.

NILS NILSON AND LEONARD NILSON, OF WAYZATA, MINNESOTA.

TRACTION-PLOW.

1,164,308.

Specification of Letters Patent. Patented Dec. 14, 1915.

Application filed November 2, 1914. Serial No. 869,843.

*To all whom it may concern:*

Be it known that we, NILS NILSON and LEONARD NILSON, citizens of the United States, residents of Wayzata, county of Hennepin, State of Minnesota, have invented certain new and useful Improvements in Traction-Plows, of which the following is a specification.

Our invention relates to traction plows and particularly to the means for attaching the plows to the rear of a traction engine, and the object of our invention is to simplify and improve the attaching means shown and described in our pending application for Letters Patent of the United States, Serial No. 631,493, filed June 5, 1911.

Other objects of the invention will appear from the following detailed description.

The invention consists generally in various constructions and combinations, all as hereinafter described and particularly pointed out in the claims.

In the accompanying drawings forming part of this specification, Figure 1 is a plan view of a traction machine with our invention applied thereto, Fig. 2 is a side elevation of the same, Fig. 3 is a side elevation of the rear of the traction machine and the plows, showing the plow lift in position for use.

In the drawing, 2 represents the frame of the tractor, having forward carrying and guide wheels 3 and a source of motive power, such as an internal combustion engine 4, mounted on said frame, preferably between the forward wheels. At the rear of the machine we provide a single traction wheel 5, having an axle 6 mounted in bearings in the machine frame and driven through a belt 7 from the source of power. The details of construction of the tractor do not form a part of the invention in this case and hence will only be generally referred to.

Mounted on the tractor frame, preferably in advance of the axis of the traction wheel 5 and bridging said wheel, is a yoke 8 in the form substantially of an inverted U, with brace bars 9 extending therefrom to the frame of the tractor in front of the traction wheel to resist backward pull on the yoke. To this yoke the draft connections for the plows are attached, as will hereinafter appear.

10, 11 and 12 represent a series of plow beams, supporting plows 13, said beams being rigidly connected with one another by cross braces 14. These beams are of varying length, as usual, to provide for the diagonal or staggered arrangement of the plows with respect to one another. A crank axle 15 is journaled in bearings 16 near the forward ends of the plows and is provided with carrying wheels 17 which have the function of regulating the depth of the furrows, their vertical adjustment being determined by the movement of the crank axle. This movement of the crank axle is preferably accomplished by means of a bar 18, secured at its rear end to the middle beam 11 and adjustably connected by means of holes 19 therein with the upper portion of an arm 20 that is rigidly mounted on the middle portion of the crank axle. (See Fig. 2.) By moving this arm 20 forward or backward, the axle will be rocked in its bearings on the frame to raise or lower the supporting wheels until the desired depth of cut is obtained.

At the forward ends of the beams is a cross bar 21 rigidly secured by suitable braces 22 to the beams and projecting outwardly on each side thereof, and arched bars 23 have their forward ends bolted to the ends of the cross bar and their rear ends to the rear portions of the plow beams. The forward legs of these arched bars have a series of holes 24 therein and bolts 25 are adjustable in these holes for securing said bar rigidly to the ends of the cross bar. Draft links 26 are provided, having a series of holes 27 to receive bolts 28 for securing them to the arched bars 23 and by moving the links up and down on these arched bars, the point of connection of the draft means with the plows can be raised or lowered, as desired, and the holes in the draft links allow the draft connections to be taken up or loosened, as may be found advisable in the operation of the machine.

To the forward ends of the draft links 27, flexible draft connections 29 are attached at one end, while their opposite ends engage hooks 30 pivoted on the upper portion of the yoke 8 upon opposite sides of the traction wheel and above the axis thereof. A uniform draft can be obtained on these flexible connections by the longitudinal adjustment of the draft links on their supporting bars. Thus one draft connection can be made a little longer than the other one to cause the plows to work laterally into or out of the land, as may be desired. These draft connections, preferably composed of chains, exert a downward pull on the tractor frame, tending to lift the forward ends thereof and depress the rear end, thereby increasing the traction of the rear wheel in substantially the manner set forth and described in our application above referred to. We have found that with this draft connection the efficiency of the tractor is materially increased and that a greater number of plows can be easily drawn than would be possible where the draft connection is made to the rear portion of the tractor frame in the usual way. It is unnecessary to place weights on the tractor, as frequently is done to increase the traction, the down draft of the chains being sufficient to hold the traction wheel in the soil and the greater the pull, the greater the downward pressure on the frame and the closer the traction wheel will hug the ground. We have also found, in the operation of this machine, that the backward and downward pull of the draft connections will, under a certain degree of strain, raise the forward guide wheels off the ground, and it is then desirable to reduce the leverage of the draft connections on the machine frame. This we accomplish by providing a series of holes 30' in each leg of the yoke 8, adapted to receive the pivots of the hooks 30 and allow their adjustment toward and from the axis of the traction wheel to regulate the leverage of the draft chains on the frame proportionately to the pull of the plows. If the maximum number of plows are used, and there would be a heavy draft of the yoke 6, then the hooks may be lowered and brought nearer the center of the traction wheel, and a greater pull will then be required to raise the guiding wheels off the ground than where the hooks are near the top of the yoke. If only a minimum number of plows are used, then the draft connections may be attached near the top of the yoke and in this way the strain on the machine frame, tending to lift the forward guiding wheels, can be accurately regulated under all conditions of the load on the machine. The traction of the rear wheel, of course, owing to the manner of attaching the draft connections, will increase commensurate with the pull of the chains thereon. The greater the load to be drawn, the greater the pull of the chains and the closer the wheel will grip the ground.

For the purpose of raising the plows out of the furrows, we provide a frame 31, having a flexible connection 32 with a clevis 33 on the rear portion of the middle beam. A bolt 34 is provided at the forward end of the frame, adapted to fit loosely in hooks 36 mounted at the rear end of the tractor frame. Bars 37 are carried by the bolt 34 and similar bars 38 are pivoted on the bars 37 and adjustably connected with the frame 31. Suitable flexible means, such as chains 32, connect the frame with the forward ends of the plow beams and a lifting chain 41 connects the frame 31 with a drum 42 mounted preferably on the yoke or draft-attaching means that is carried by the frame of the tractor. This drum is revolved by a belt 43 connected with a source of power. We make no claim to this lifting device in this application, the same being the subject matter of a companion application of even date herewith.

It will be noted that the plows have no direct connection with the tractor frame, except through the flexible draft means extending from the plow frame to the upper portion of the yoke, the lifting device having no draft function whatever and merely operating as a guide or bearing for the plow frame while the plows are being raised.

We claim as our invention:

1. The combination, with a traction machine having forward guiding means and a rear traction wheel and a draft attaching means extending above the axis of said traction wheel, of a plow frame and supporting wheels therefor and plows connected to said frame, and draft connections extending from said draft attaching means to said plow frame and exerting a downward pull on said traction machine and wheel.

2. The combination, with a traction machine having forward guiding means and a rear traction wheel, of a draft attaching means supported on said frame upon opposite sides of said wheel and extending above the axis thereof, a plurality of plows and draft connections between said plows and said draft attaching means, said draft connections being disposed upon opposite sides of said traction wheel and exerting a downward pull on said wheel to increase the traction thereof and guide said plows.

3. The combination, with a traction machine having forward guiding means and a rear traction wheel, and a draft attaching means supported upon said frame upon opposite sides of said wheel, of a series of plows, flexible means connecting said plows with said attaching means on opposite sides of said wheel at a point above the axis of said wheel and near the periphery thereof.

4. The combination, with a traction machine having forward guiding means and a rear traction wheel and a draft attaching means supported upon said frame upon opposite sides of said wheel, of a series of plows, flexible means connecting said plows with said attaching means on opposite sides of said wheel at a point above the axis of said wheel and near the periphery thereof, and means for shortening or lengthening said flexible connecting means to guide the plows.

5. The combination, with a traction machine having forward guiding means and a rear traction wheel and a draft attaching means supported upon said traction machine and extending above the axis of said traction wheel, of a plow frame, a series of plows mounted thereon, links adjustably connected with said frame on each side thereof, a flexible draft means connected to said links and to said draft attaching means and exerting a downward pull on said traction machine and wheel, said flexible means forming the only draft connections between said plows and traction machine, the adjustment of said links increasing or decreasing the length of said draft means, for the purpose specified.

6. The combination, with a traction machine having forward guiding means and a rear traction wheel, of a yoke mounted on said machine and straddling said rear traction wheel, a series of plows, flexible draft means connected with said plows and with said yoke on each side of said wheel above the axis thereof, said draft means guiding said plows and the pull thereof increasing the traction of said wheel.

7. The combination, with a traction machine having forward guiding means and a rear traction wheel, of a yoke mounted on said machine and straddling said rear traction wheel, a series of ground-working implements, flexible draft means connected with said implements and with said yoke on each side of said wheel above the axis thereof, said draft means being vertically adjustable on said yoke to increase or decrease the leverage on the forward portion of the machine.

8. The combination, with a traction machine having forward guiding means and a rear traction wheel, of a yoke mounted on said machine and straddling said rear traction wheel, the legs of said yoke having a series of holes therein, one above another, upon each side of said wheel, and hooks adjustable in said holes, a series of ground-working implements, flexible draft means connected with said implements and with said hooks, the vertical adjustment of said hooks in said yoke increasing or decreasing the leverage of said draft means upon said machine.

9. The combination, with a traction machine having forward guiding means and a rear traction wheel, and a draft attaching means, of a series of plows, flexible means connecting said plows with said attaching means on opposite sides of said wheel above the axis thereof, the points of connection of said flexible means with said draft attaching means being vertically adjustable for increasing or decreasing the leverage of said flexible means upon said machine.

10. The combination, with a traction machine having forward guiding means and a rear traction wheel and a draft attaching means, a series of ground-working implements, flexible means connected with said implements and with said draft attaching means on opposite sides of said wheel above the axis thereof, the points of connection of said flexible means with said draft-attaching means being vertically adjustable for increasing or decreasing the leverage of said flexible means upon said machine.

In witness whereof, we have hereunto set our hands this 27th day of October, 1914.

NILS NILSON.
LEONARD NILSON.

Witnesses:
EDWARD A. PAUL,
GENEVIEVE E. SORENSEN.